H. M. BARNES.
COMBINATION CARRIER AND CLOSURE FOR FRUIT BASKETS.
APPLICATION FILED APR. 5, 1913.
1,150,732. Patented Aug. 17, 1915.
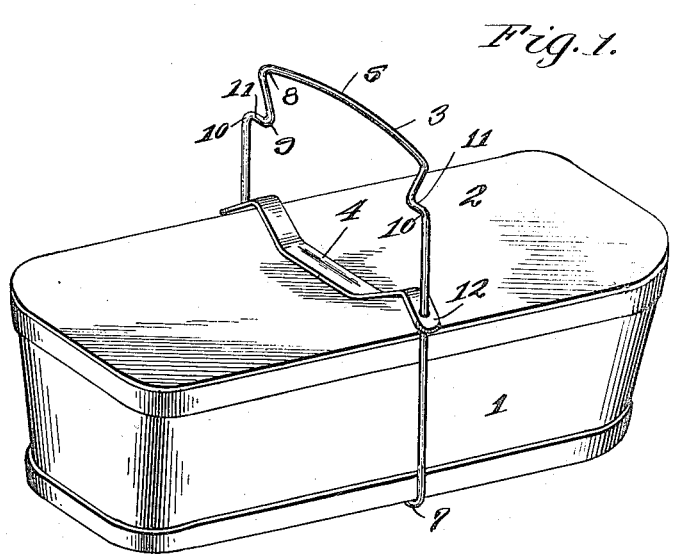
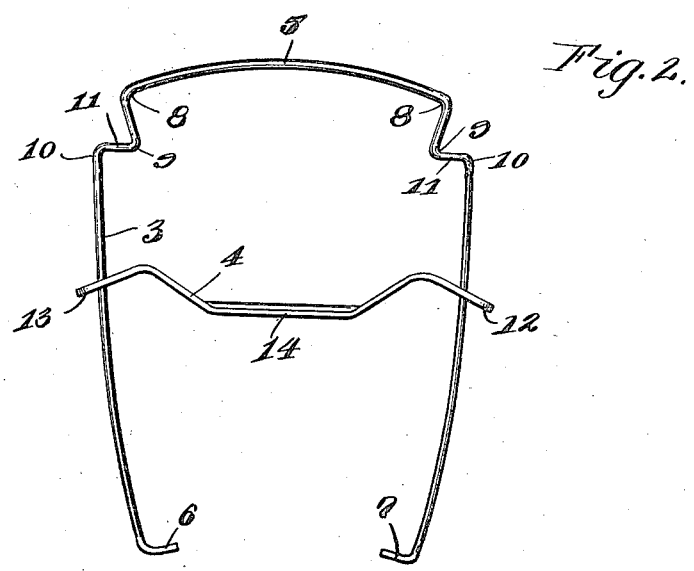
WITNESSES
INVENTOR
Herbert M. Barnes,
His Attorney

UNITED STATES PATENT OFFICE.

HERBERT M. BARNES, OF SILVER CREEK, NEW YORK.

COMBINATION CARRIER AND CLOSURE FOR FRUIT-BASKETS.

1,150,732.

Specification of Letters Patent.  Patented Aug. 17, 1915.

Application filed April 5, 1913. Serial No. 759,184.

*To all whom it may concern:*

Be it known that I, HERBERT M. BARNES, citizen of the United States, residing at Silver Creek, in the county of Chautauqua and State of New York, have invented certain new and useful Improvements in a Combination Carrier and Closure for Fruit-Baskets, of which the following is a specification.

This invention relates to the class of wire carriers for fruit baskets which are so constructed that they serve the dual purpose of a handle for carrying the basket and as clamping means for securely holding the cover for the basket thereupon.

An object of this invention is to produce a handle of this character which may be easily, and conveniently applied to the basket and one which will securely hold the cover of the basket tightly thereupon without the aid of any other type of clamps, staples or the like, such as is commonly used for this purpose.

Another object of this invention is the provision of a carrier of the type above set forth, which is extremely simple in construction, and owing to its simplicity of construction, may be easily and cheaply manufactured.

With the foregoing and other objects in view, this invention consists of such novel features of construction, combination and arrangement of parts as will be hereinafter more fully described, illustrated in the accompanying drawings and claimed.

In describing the invention in detail, reference will be had to the accompanying drawings wherein like characters of reference designate like or corresponding parts throughout the several views, and in which:

Figure 1, is a perspective view of a fruit basket showing the improved carrier attached thereto, Fig. 2, is a side elevation of the carrier.

In Fig. 1 of the drawings, a fruit basket 1 is shown, and this basket represents any type of the ordinary veneer fruit basket which is used for the distribution of grapes, peaches and various other fruits. The basket 1, is shown as oblong in shape and having a cover 2 which fits securely upon the top and forms a closure for the opening of the basket, which cover is held in place by the wire carrier or bail member 3 and the metallic strip 4.

The wire carrier or bail member 3 is constructed of a single piece of resilient wire and is bent to form substantially the shape of an inverted U, having its upper or connected end 5 curved slightly so as to form a more convenient grip or handle portion for carrying the basket. The free or lower ends of the carrier 3 are bent inwardly at substantially right angles to the legs of the same as is shown at 6 and 7 and these angled ends engage the under surface or the bottom of the basket when the carrier is attached as is clearly shown in Fig. 1 of the drawings. The wire, which composes the carrier 3, is bent inwardly and outwardly a short distance below the handle portion 5, as is shown at 8, 9 and 10, so as to form a shoulder or abutment 11 against which the metallic strip 4 abuts so as to prevent the latter from being moved upwardly upon the legs of the carrier 3 so as to engage or pinch the fingers of the person who is carrying the basket. Both ends of the metallic member 4 are bowed to form off set portions having their extreme outer ends 12 and 13 bent downwardly so as to engage the sides of the cover 2 to more effectively hold the same upon the basket 1 and the central portion 14 is flat so as to engage the upper surface of the lid 2.

When it is desired to place the carrier 3 upon a fruit basket such as the one shown in Fig. 1 of the drawings, the metallic member 4 is moved upwardly upon the sides of the wire of which the carrier 3 is constructed and until it engages the shoulder 11. The outer ends of the legs of the carrier 3 are then sprung outwardly and moved downwardly from the sides of the basket until the spring action contained in the wires cause the angled ends 6 and 7 to spring inwardly under the bottom of the basket. The metallic member 4 is then moved downwardly until the flat portion 4 and the ends 12 and 13 thereof, engage the cover 2 when the same is placed tightly upon the basket 1. This forms a secure means for holding the cover upon the basket as well as providing an efficient and practical means for attaching a carrier, for carrying a basket about from one place to another.

What is claimed is:

1. A carrier and closure for baskets comprising a wire handle having depending portions adapted to grip the basket, a metallic strip having bowed ends and perforations formed in said bowed ends, the bowed ends forming a spring gripping jaw to hold the perforations normally at all times in binding relation to said depending portions.

2. In a carrier and closure for baskets, a wire handle, having depending spring wire members adapted to grip the basket, said depending members being bent inwardly and outwardly adjacent said handle portion to form shoulders, a metallic strip having bowed ends and perforations formed in said bowed ends, the walls of said perforations adapted to engage the depending members in binding relation, said metallic strip adapted to be limited in upward movement by said shoulders, said metallic strip adapted to securely hold the cover of a basket in closed position by means of the binding engagement between the walls of the openings formed in said metallic strip and said depending members.

3. In a carrier and closure for baskets, a wire handle member having depending spring wire basket engaging portions adapted to grip the bottom of the basket, a metallic strip comprising a body portion, upwardly and downwardly bent portions on each end of said metallic strip, perforations formed on said downwardly bent portions, the walls of said perforations being in binding engagement with the depending portions, said depending portions having inwardly and outwardly bent portions adjacent the handle member of said carrier, said inwardly and outwardly bent portions forming shoulders whereby to limit the upward movement of said metallic strip.

In testimony whereof I affix my signature in presence of two witnesses.

HERBERT M. BARNES.

Witnesses:
C. G. JAEKLE,
MURLE L. ROWE.